US007461523B2

(12) United States Patent
Mersmann et al.

(10) Patent No.: US 7,461,523 B2
(45) Date of Patent: Dec. 9, 2008

(54) APPARATUS FOR CONTACTLESS MEASUREMENT OF THE TEMPERATURE IN A MELTING FURNACE

(75) Inventors: Markus Mersmann, Stelle (DE); Heinz Lambrecht, Bremen (DE)

(73) Assignee: BEGO Bremer Goldschlägerei Wilh. Herbst GmbH & Co., Breman (DE)

( * ) Notice: Subject to any disclaimer, the term of this patent is extended or adjusted under 35 U.S.C. 154(b) by 259 days.

(21) Appl. No.: 11/247,595

(22) Filed: Oct. 12, 2005

(65) Prior Publication Data

US 2006/0075784 A1 Apr. 13, 2006

(30) Foreign Application Priority Data

Oct. 12, 2004 (DE) ...................... 10 2004 049 789

(51) Int. Cl.
*C03B 18/22* (2006.01)

(52) U.S. Cl. .......................... 65/29.21; 65/158; 65/162

(58) Field of Classification Search ............... 65/29.21, 65/158, 162
See application file for complete search history.

(56) References Cited

U.S. PATENT DOCUMENTS 4,580,617 A * 4/1986 Blechner et al. ............ 164/493
4,647,222 A * 3/1987 Schultheiss ................. 374/139
4,648,711 A * 3/1987 Zachary ....................... 356/44
4,657,385 A * 4/1987 Pointer ........................ 356/43
5,052,661 A 10/1991 Dunlay et al.
5,110,287 A 5/1992 MacPherson et al.
6,014,263 A 1/2000 Schaeffer et al.
2004/0178545 A1* 9/2004 Cates ......................... 266/100

FOREIGN PATENT DOCUMENTS

DE 80 31 194.0 11/1980
EP 1 440 750 7/2004
FR 2 624 971 6/1989

* cited by examiner

*Primary Examiner*—Steven P Griffin
*Assistant Examiner*—Russell J Kemmerle, III
(74) *Attorney, Agent, or Firm*—Roylance, Abrams, Berdo & Goodman, L.L.P.

(57) ABSTRACT

The invention relates to an apparatus for contactless temperature measurement of a melting charge located in a melting crucible 2 inside a melting furnace, in particular a furnace for precision casting, by means of a pyrometer 5 with an optical system 8 and at least one sensor 6 optically connected to said optical system 8, wherein said optical system 8 can be directed by means of a sight glass 18 onto at least one section of the melting crucible 2. In order to reduce soiling caused by smoke gas deposits on the sight glass, a tube is provided which is connected at its upper end to the sight glass 18, extends into a melting chamber 11 of the melting furnace and can be pointed in the direction of the melting crucible 2.

18 Claims, 6 Drawing Sheets

APPARATUS FOR CONTACTLESS MEASUREMENT OF THE TEMPERATURE IN A MELTING FURNACE

The invention relates to an apparatus for contactless temperature measurement of a melting charge located in a melting crucible inside a melting furnace, in particular a furnace for precision casting, by means of a pyrometer with an optical system and at least one sensor optically connected to said optical system, wherein said optical system can be directed by means of a sight glass onto at least one section of the melting crucible.

Such contactless temperature measuring systems for precisely sensing the temperature of a melt inside a melting furnace for precision casting, in particular in the field of dental technology, are known from EP 1 440 750 A1, for example.

Figure 1:
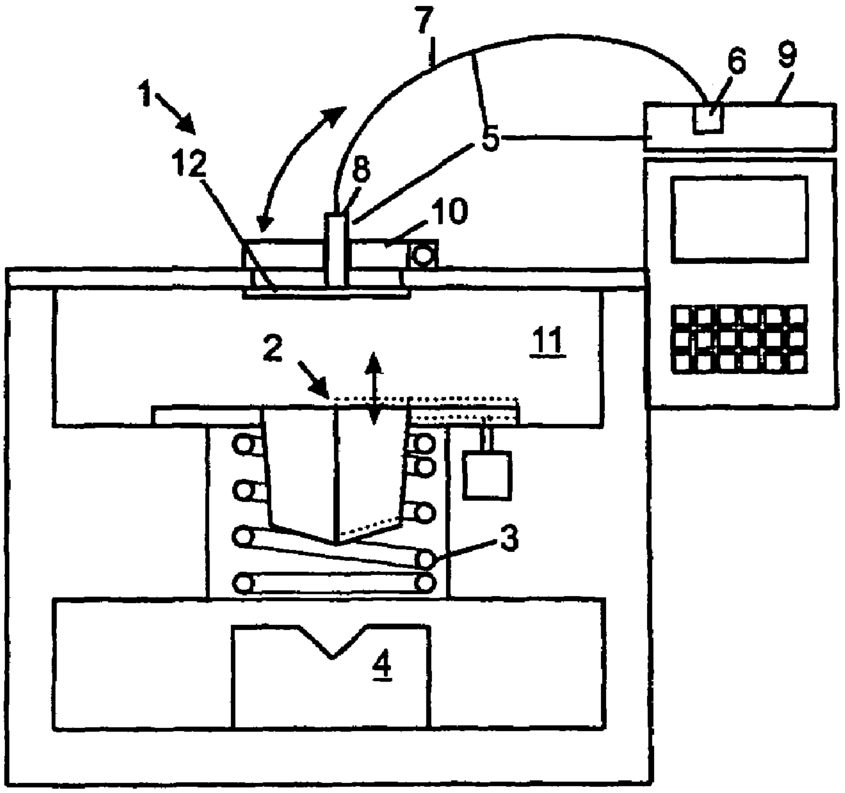
Prior Art Fig. 1

FIG. 1 shows such a prior art apparatus 1 for a precision casting process of melting and casting such as that used in the field of dental technology laboratories, in particular. This device has a melting crucible 2 for receiving a melting charge (not shown), and a heating device 3 for heating the melting charge in the melting crucible 2. Underneath melting crucible 2 and heating device 3 there is a casting mould 4 into which the liquid melt can be poured from melting crucible 2 in order to make dental bridges, crowns or other precision cast products, for example.

The melting charge is transferred from melting crucible 2 to casting mould 4 by raising one half of the two-part melting crucible 2 to produce an opening in the lower portion of the melting crucible from which the melting charge can be poured into casting mould 4.

During such a casting process, the current temperature of the melting charge is of particular interest for many products, especially for products made with precision casting technology. Said temperature is measured contactlessly by means of pyrometer 5. Pyrometer 5 has a sensor 6 which operates in the infrared range and which is connected to an optical system 8 by way of an optical waveguide 7. Sensor 6 is coupled by optoelectronic components to an electronic system 9 of the pyrometer 5, which converts the optical signals or light signals into electrical signals from which the radiation power detected by sensor 6 can then be converted into a temperature value. Optical system 8 is disposed inside a hinged cover 10 which provides a view inside the interior 11 of the melting apparatus 1 (melting chamber). To protect the optical pyrometer system 8 against excessive heat, in particular, a melting chamber window 12 separating the melting chamber 11 from the optical pyrometer system 8 is provided.

Measurement inaccuracies due to soiling of the melting chamber window 12 by smoke gases have been found to occur when some alloys are being melted. Deposits on the melting chamber window 12 are caused by volatile metal constituents with a low boiling point, such as zinc, for example, or by vapours from molten powder. Although such deposits can usually be removed quite easily, some users tend to ignore the prescribed cleaning intervals. This then results in mismeasurements and ultimately has a deleterious effect on the quality of the products being made.

The invention therefore addresses the technical problem of reducing such soiling.

The invention solves this problem in an apparatus of the kind initially mentioned by providing a tube which is connected at its upper end to the sight glass, extends into a melting chamber of the melting furnace and can be pointed in the direction of the melting crucible.

The invention is based on the realisation that smoke particles are carried by the melt in a convection process to the upper side of the melting chamber, where the particles are then deposited. To ensure that the smoke particles are not deposited on the viewing window of the optical pyrometer system, it is advantageous to inhibit or at least substantially minimise such convection in the area of said viewing window.

The invention is also based on the realisation that air flow inside the tube can be avoided almost completely by means of a long tube having as small an inner cross-section as possible. Preventing such air flow also inhibits the flow of smoke particles to the area around the sight glass of the optical pyrometer system, with the result that the sight glass in front of the optical pyrometer system remains largely unimpaired by smoke particles.

Another advantage of the tube is that there is significantly less smoke in the field of view of the sensor, because the tube does not even begin to fill with smoke, or fills to only a minimal extent. Since such smoke or smoke gases can impair the view that the pyrometer sensor has of the melting charge, it is particularly advantageous to reduce the amount of smoke in the optical path from the melting charge to the optical pyrometer system.

By means of the steps of the invention, temperature measurement with an optical pyrometer can be significantly improved.

It is particularly preferred for the upper end of the tube to be sealed gas-tight by means of the sight glass, with the lower end of the tube remaining open. Sealing the upper end of the tube gas-tight prevents any convectional flow inside the tube, even when the lower end of the tube is open. An open bottom end of the tube is advantageous, because any closure with an additional glass member at the lower end of the tube would likewise form a surface for the precipitation of smoke particles.

In yet another preferred embodiment, the cross-sectional area of the tube is substantially about the same as the cross-sectional area of the spot measured by the pyrometer. This minimises the cross-section of the tube. Such minimisation is advantageous because it results in very little smoke being able to enter inside the tube.

In another preferred embodiment of the invention, the length of the tube is such that the lower end of the tube is located below a section of the melting chamber which fills with smoke whenever a predetermined amount of melting charge has been melted in the melting furnace. Due to the fact that hot gases rise, the upper section of the melting chamber is filled with smoke if smoke particles are able to reach said upper space by convection. However, such convection does not occur at all, or only to a very small extent in the region of the tube, so no smoke particles or only very few are then able to reach the inside of the tube when the smoke particles are able to move into other parts of the melting chamber. The longer the tube, i.e. the lower the lower end of the tube is located, the greater the space that can be filled with smoke particles from the hot molten mass.

In one particular embodiment of the invention, the length of the tube is such that the lower end of the tube ends in the region of the upper rim of the melting crucible or the molten mass. By this means, a particularly long tube is obtained in which the proneness of the sight glass of the optical pyrometer system to being soiled is particularly low.

Figure 2:
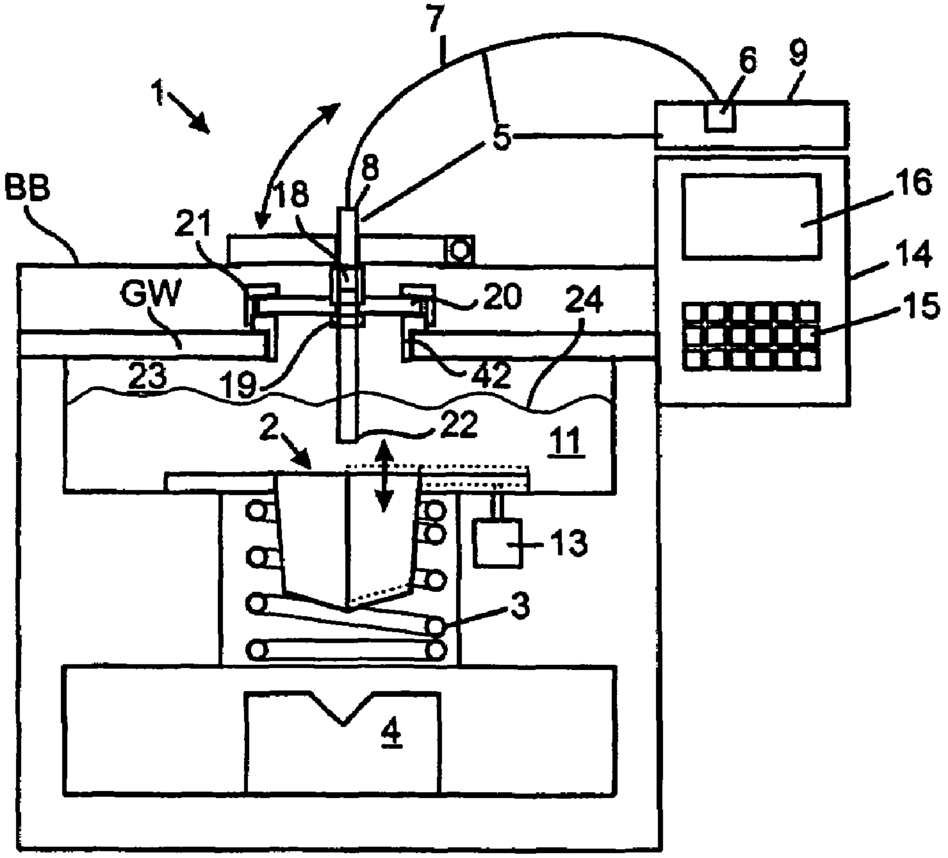
Figure 3:
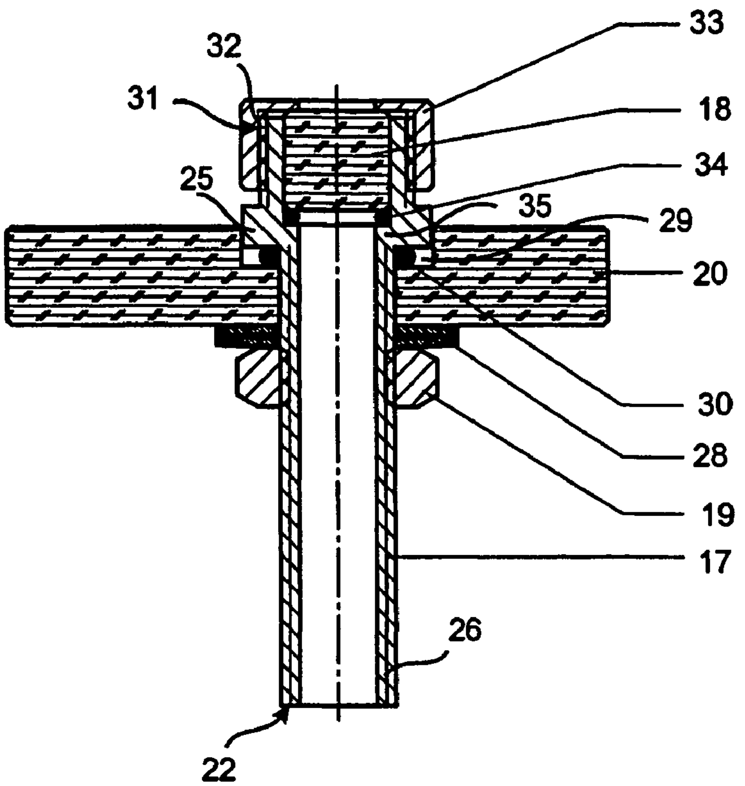
Figure 4:
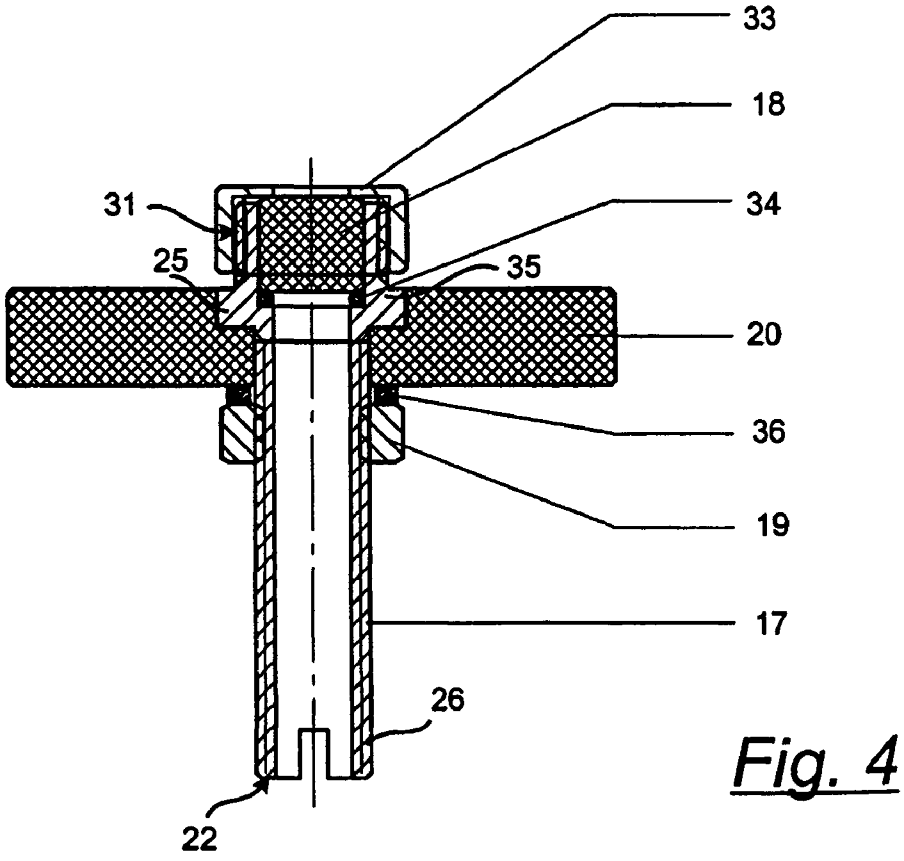
Figure 5:
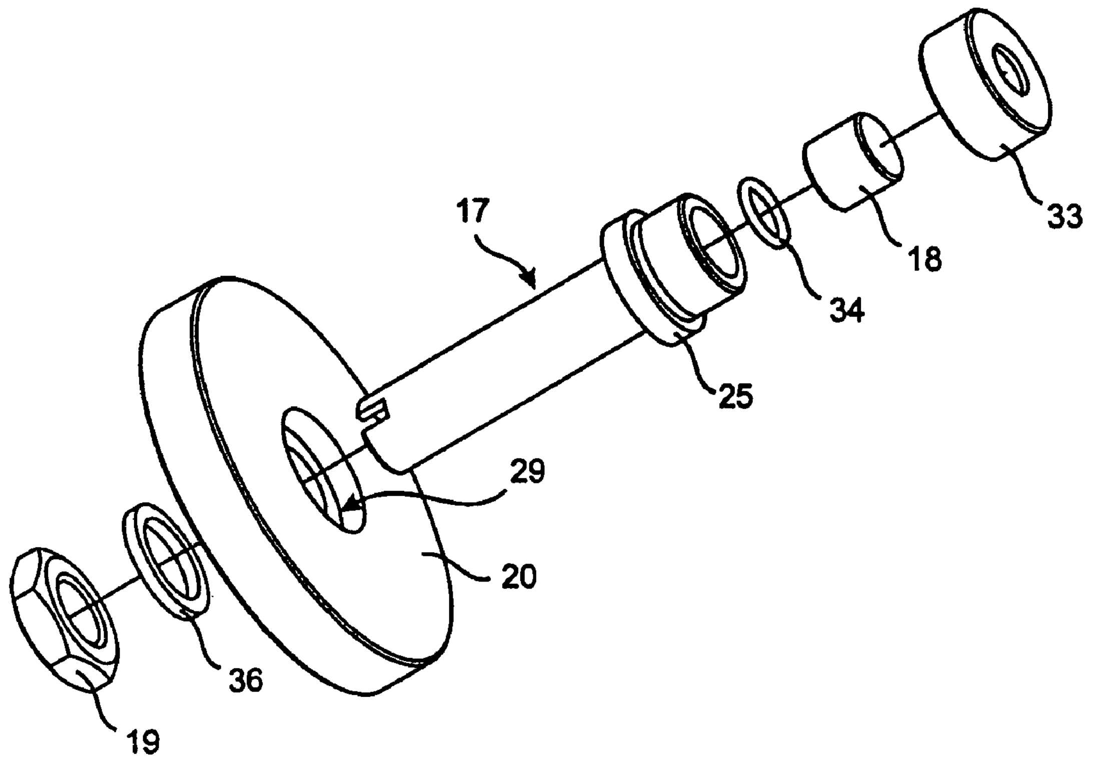
Figure 6:
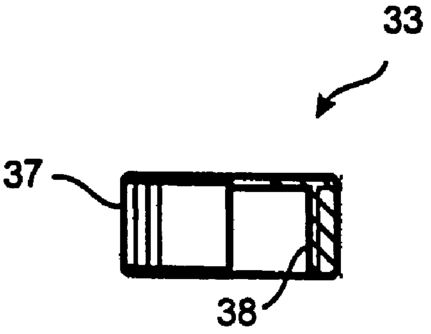
Figure 7:
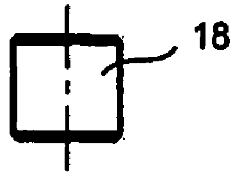
Figure 8:
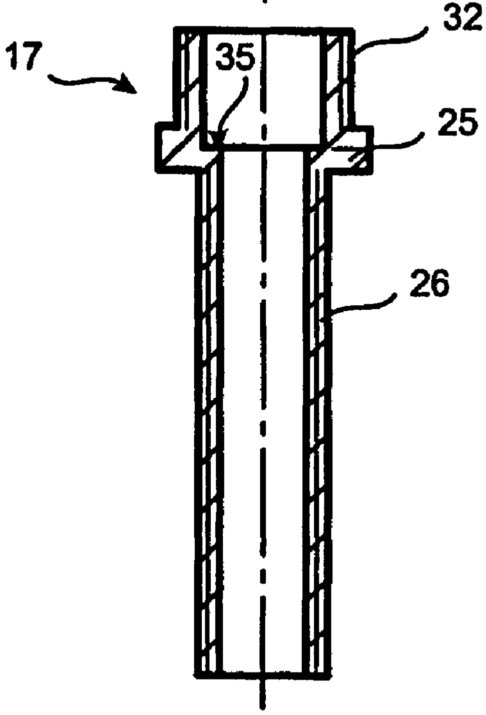
Figure 9:
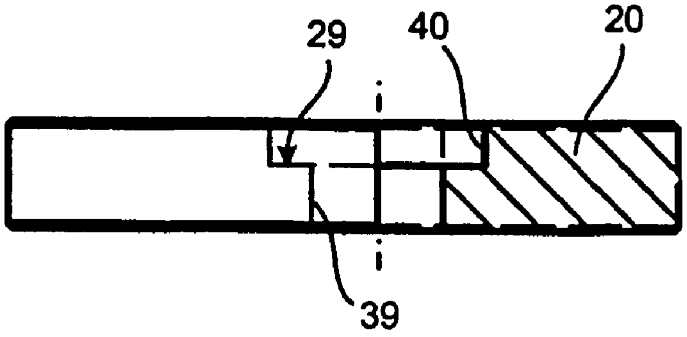

Other special embodiments are characterized in the subclaims, and in the embodiments explained with reference to the enclosed drawings. The drawings show:

FIG. 1 a prior art apparatus for contactless temperature measurement of a melting charge located in a melting crucible inside a melting furnace;

FIG. 2 a simplified view of an apparatus according to an embodiment of the invention for contactless temperature measurement of a melting charge located in a melting crucible inside a melting furnace;

FIG. 3 a sectional view of a first embodiment of an apparatus according to the invention;

FIG. 4 a sectional view of a second embodiment of an apparatus according to the invention;

FIG. 5 a perspective exploded view of the embodiment shown in FIG. 4;

FIG. 6 a cap nut for use in one of the embodiments shown in FIGS. 3 to 5;

FIG. 7 a sight glass for use in one of the embodiments shown in FIGS. 3 to 5;

FIG. 8 a tube member for use in one of the embodiments shown in FIGS. 3 to 5;

FIG. 9 a sight glass for use in one of the embodiments shown in FIGS. 3 to 5, and FIG. 10 a sectional view of a sight glass pane and mounting arrangement for use in the embodiment shown in FIG. 2.

FIG. 2 shows an apparatus 1 for contactless measurement of the temperature of a melting charge inside a melting furnace corresponding largely to apparatus 1 as shown in FIG. 1. To avoid the risk of repetition, reference is made to the features explained therein unless otherwise specified in the following. The same reference numerals are also used in FIG. 2 as in FIG. 1. Attention is drawn in particular to the comments on those elements of FIG. 1 referenced with numerals 1 to 11.

The following comments are added, however. The right-hand half of melting crucible 2 is mechanically coupled to an actuating device 13 for opening the melting crucible, said actuating device being capable of raising and lowering the right-hand half of melting crucible 2 (or, in an alternative embodiment not shown here, its left-hand, front or rear half). Actuating device 13 is connected to a controller 14 in such a way that controller 14 can automatically trigger the opening of the melting crucible and hence the casting process.

Alternatively, however, the casting process can also be initiated by tilting a one-piece melting crucible. An actuating device is likewise provided, but said actuating device can cause the melting crucible to tilt. Such an actuating device is likewise connected to the controller 14.

Controller 14 also controls a generator (not shown) that supplies heating device 3 with electrical energy.

The temperature sensed by pyrometer 5 is sent to controller 14, which controls or regulates the melting and casting process in response to the temperature sensed. Controller 14 has an input unit 15 for inputting identification parameters for melting charges, as well as other input and process variables. Controller 14 also has a display unit 16 for displaying inputted or process data to the user.

Melting chamber 11 is configured as a pressure chamber. Before and during casting, said pressure chamber 11 is evacuated to produce a vacuum inside pressure chamber 11. Having such a vacuum during casting is advantageous, in that the reduced oxygen concentration results in reduced oxide formation. After the melting charge has been placed in the casting mould 4, however, over-pressure is produced inside chamber 11 in order to press the melting charge into every part of casting mould 4. Chamber 11 is connected for this purpose to an under-pressure/over-pressure pump (not shown), which in combination with controller 14 can adjust the under-pressure or over-pressure in chamber 11.

In apparatus 1 as described above, sensor 6 was coupled by way of an optical waveguide 7 to an optical system in the region of melting chamber 11. This arrangement can also be used in combination with embodiments according to the present invention. Alternatively, according to the present invention, sensor 6 can also be disposed in the immediate proximity of melting chamber 11 without the interposition of an optical waveguide 7, in particular when no degree of mobility is required between the optical system and the sensor.

Unlike in the apparatus shown in FIG. 1, a tube member 17 connected to a sight glass 18 and fastened by a nut (e.g. a hexagon nut) 19 to a sight glass pane 20 is located inside melting chamber 11 and directed from above onto the bottom of melting crucible 2. Sight glass pane 20 is directly or indirectly connected, for example, to an upper, preferably hinged housing wall GW of the melting chamber, for example by means of a screw socket 42 mounted on housing wall GW, to which screw socket the sight glass pane 20 is tightly fastened by a nut 21. Details of how the sight glass pane is attached are provided below. Other alternative options for sealing off sight glass pane 20 at the upper housing wall GW of melting chamber 11 are provided.

Cover 10, which is likewise hinged and includes one or more tinted sight glasses through which optical system 8 extends, abuts above sight glass 18. Said cover 10 is mounted on a sheet metal cover BB associated with the upper housing wall GW of chamber 11.

The lower end of the tube (22) is located so low that it is below a section 23 of melting chamber 11 that fills with smoke 24 whenever a predetermined amount of melting charge has been melted in the melting furnace. In this way, the optical path between the optical pyrometer system 8 and the lower end of the tube 22, and hence the melting charge to a substantial extent, are kept largely free of smoke that could otherwise have a detrimental effect on measuring the temperature of the melting charge.

Sight glass pane 20 is used for additional visual inspection of the process inside the melting furnace. However, visual inspections can be dispensed with due to automation of the melting and casting process with the support of the invention, so sight glass pane 20 can be replaced in an alternative embodiment by a simple, non-transparent plate.

Tube member 17 extends through sight glass pane 20, which is provided for this purpose with a through bore or opening corresponding to the cross-section of tube member 17. Alternatively, however, tube member 17 may also extend downwards from the underside of sight glass pane 20 and be glued, for example, to its underside. The optical path from the optical pyrometer system 8 to the melting charge would then pass through sight glass pane 20.

FIG. 3 shows the central element by means of which the optical pyrometer system (not shown) is optically connected by way of tube member 17 to melting chamber 11. Tube member 17 extends through a bore or opening through sight glass pane 20 and has a circumferentially projecting portion 25 in the region of its upper end 31, said projecting portion having an external diameter that is greater than the diameter of the tube section below it, which passes through sight glass pane 20.

This lower tube section has an external thread 26 onto which nut 19 can be screwed. Said nut 19 pulls tube member 17, with its upper circumferentially projecting portion 25, into a recess 29 in sight glass pane 20, with for example two disc springs 28 therebetween. Between the circumferentially projecting portion 25 and recess 29 there is a sealing washer 30 for providing a seal.

In the region of the upper end of the tube 31, above the circumferentially projecting portion 25, there is a section with an external thread 32 for screwing down a cap nut 33. In the region of the upper end of the tube 31, tube member 17 has a cross-section inside the tube which is larger than that of the inner tube section below it, said enlarged cross-section serving to receive the sight glass 18. Said sight glass has substantially the same cross-sectional area, thus sealing the inside of the melting chamber 11 from its surroundings. When cap nut 33 is tightened, sight glass 18 inside the upper end portion 31 is pressed against a sealing washer 34, which for its part is supported by a protrusion 35 inside tube member 17.

The constructional design described in the foregoing functions simultaneously as burst protection for sight glass pane 20, in that disc springs 28 in combination with sealing washer 30 form an over-pressure valve. As soon as a certain over-pressure has formed inside melting chamber 11, tube member 17 is pressed axially outwards, i.e. tube member 17 in the FIG. 3 is raised upwards. Disc springs 28 are compressed in the process, and the pressure on sealing washer 30 is simultaneously relaxed. When a certain over-pressure limit is reached, sealing washer 30 no longer seals tube member 17 completely against sight glass pane 20, with the result that the over-pressure in melting chamber 17 can escape to the outside. As soon as the pressure has fallen below said pressure limit, tube member 17 is sealed against sight glass pane 20 again by sealing washer 30 due to the restoring force of disc springs 28, with the result that melting chamber 11 is sealed from its surroundings. In this way, the constructional design of tube member 17 combined with disc springs 28 and sealing washer 30 enables the over-pressure to be easily regulated in a way that limits the pressure in melting chamber 11 to a maximum permissible over-pressure. This over-pressure limit at which over-pressure escapes is set by selecting appropriate disc springs 28 and in particular by the number of springs 28 and by the biasing force produced by means of nut 19.

FIG. 4 shows a further embodiment that largely corresponds to the embodiment shown in FIG. 3. Identical reference numerals are therefore used for the same components. With regard to said identical components, reference is made to the explanations above. Attention is drawn to the following differences, however. Disc springs 28 in FIG. 3 are replaced by an additional sealing washer 36. By mounting said sealing washer 36 inside the melting chamber, it is possible to dispense with the sealing washer 30 shown in FIG. 3.

In this embodiment, there are two axially extending slots at the lower end of the tube. These slots are used to fixate tube member 17 when tightening nut 19 and cap nut 33.

FIG. 5 is an exploded view of the embodiment shown in FIG. 4. Reference is made in this regard to the explanations provided in the foregoing.

FIG. 6 shows the cap nut 33 in a partial cross-sectional view. Said cap nut 33 has a knurl 37 on its outer edge. Cap nut 33 has an internal thread 38 on the inside.

FIG. 7 shows the sight glass in a more detailed separate view. Said sight glass 18 is cylindrical in shape. It is preferably made of silicate glass, in particular borosilicate glass.

FIG. 8 shows tube member 17 in a more detailed separate view. The various sections of tube member 17 have already been described in the context of FIGS. 2-4, so reference is made to said descriptions. An additional aspect to which attention is drawn is that the tube member is generally rotationally symmetric about its longitudinal axis, which not only provides significant advantages when producing threads 26 and 32, but also makes it significantly easier to process the various sections of tube member 17, in that tube member 17 can be turned.

FIG. 9 shows sight glass pane 20 in a more detailed separate view, namely in a partial sectional view. Sight glass pane 20 has a through bore 39, to which a through bore 40 of larger diameter is connected further up. The transition between the two bores 39 and 40 forms the aforementioned circumferentially projecting portion 25. The sight glass pane 20 is preferably made of silicate glass, in particular borosilicate glass.

Bores 39 and 40 are in either a centre or off-centre position in sight glass pane 20, which is preferably point or rotationally symmetric. An off-centre position is advantageous, because in this way the optical system 8 of the sensor, combined with tube member 17, does not need to be positioned at a fixed location, but can be variably positioned along a predetermined path, in particular a circular path.

The structure described in the foregoing enables sight glass 18 to be easily assembled and disassembled, with the result that sight glass 18 can be easily cleaned or replaced.

Figure 10:
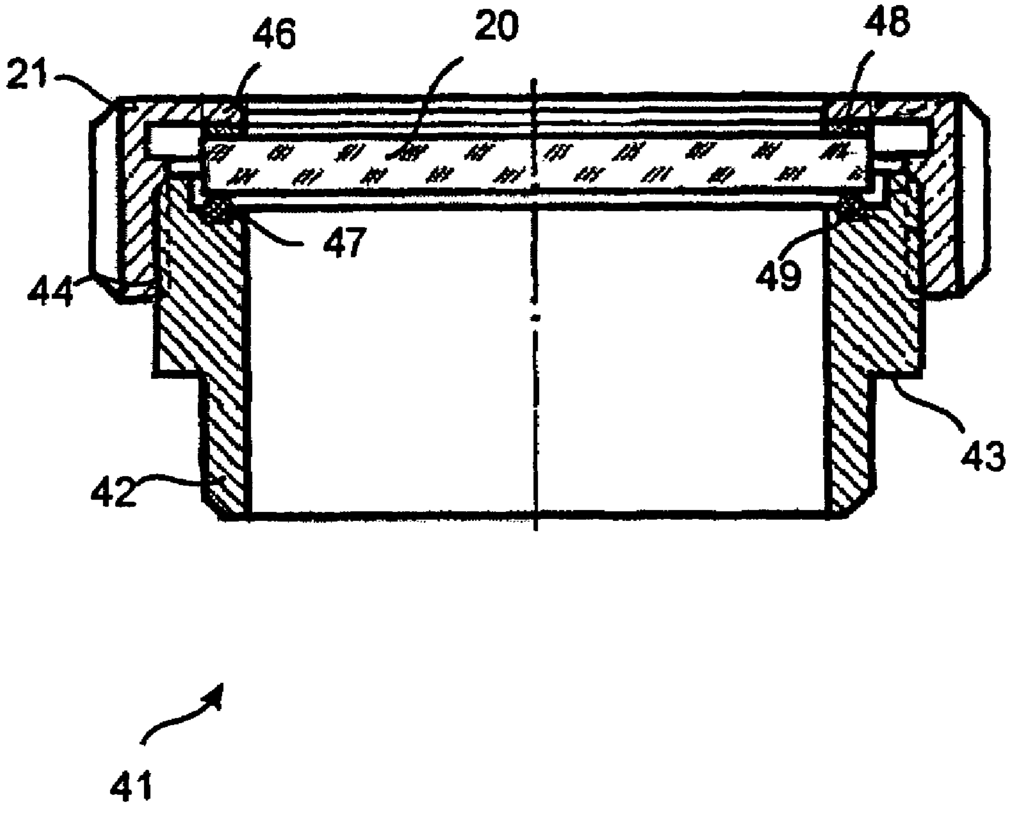

FIG. 10 shows an arrangement 41 for mounting sight glass pane 20 on the upper housing wall GW of chamber 11. This arrangement includes the screw socket 42 already mentioned in connection with FIG. 2, which has an external shoulder 43 that can fit into a corresponding bore or—preferably round—hole in the housing wall GW of apparatus 1. Screw socket 42 is bolted or welded in the region of shoulder 43 to housing wall GW.

Screw socket 42 also includes an external thread 44 that can be screwed together with nut 21. Nut 21 has a inward protrusion 46 configured in such a way that it covers the peripheral edges of sight glass pane 20. However, nut 21 has a screw connection to the external thread 44 of screw socket 42, such that sight glass pane 20 is pressed against an inner shoulder of screw socket 42, thus fixating it. To protect sight glass pane 20, a seal such as flat gasket 48 is provided between protrusion 46 and the outer edge of sight glass pane 20. An additional sealing washer, in particular a silicone O-ring 49, is also provided between the opposite edge of sight glass pane 20 and shoulder 47 of screw socket 42. The two seals 48, 49 protect sight glass pane 20 from damage, on the one hand, and seal the inner space 11 of the melting furnace from its surroundings, on the other hand.

In FIG. 10, through bore 39, 40 through the sight glass pane is not shown purely for the sake of simplification.

The construction according to the invention results in a highly effective smoke repellent that protects the sensitive pyrometer, in particular its optical system, against deposits of dirt, especially smoke particles, that falsify measurements. Thanks to the invention, the amount of maintenance required by temperature measurement systems in melting and precision casting systems, particularly in the dental technology field, can be noticeably reduced while also keeping measurement results at a high level of quality.

The above system has been described with reference to a closed melting and casting system. However, it is also conceivable to use the idea of the invention, namely to develop a temperature measurement sensor by attaching a tube for repelling smoke, in other melting processes as well, since the key idea of inhibiting the convectional flow of dirt particles near the viewing window of the sensor is already achieved by attaching a tube to the sensor when the tube is directed at the molten mass from above.

The invention claimed is:

1. A melting furnace having a crucible and an apparatus for contactless temperature measurement of a melting charge located in the melting crucible (2) inside the melting furnace by means of a pyrometer (5) with an optical system (8) and at least one sensor (6) optically connected to said optical system (8), wherein said optical system (8) can be directed by means of a sight glass (18) onto at least one section of the melting crucible (2), wherein the optical system further comprises a tube (17) which is connected at its upper end (31) to the sight glass (18), and extends into a melting chamber (11) of the melting furnace and points in the direction of the melting crucible (2), and where the tube has a lower end that is open to the crucible and has a length and inner diameter sufficient to inhibit smoke and particulates from entering the tube.

2. The melting furnace according to claim 1, wherein the upper end (31) of the tube (17) is sealed gas-tight by means of the sight glass (18).

3. The melting furnace according to claim 1, wherein a cross-section of the tube corresponds to the cross-sectional area of the spot measured by the pyrometer (5).

4. The melting furnace according to claim 1, wherein the length of the tube is such that the lower end of the tube (22) is located below a section (23) of the melting chamber (11) which fills with smoke (24) whenever a predetermined amount of melting charge has been melted in the melting furnace.

5. The melting furnace according to claim 1, wherein the length of the tube is such that a lower end of the tube (22) is positioned within the melting chamber of the melting furnace spaced from an upper rim of the melting crucible (2) or the molten mass.

6. The melting furnace according to claim 1, wherein the tube (17) extends through a plate (20).

7. The melting furnace according to claim 6, wherein the plate (20) has a through bore (39, 40) for receiving the tube (17).

8. The melting furnace according to claim 7, wherein the plate (20) is point or rotationally symmetric and the through bore (39,40) for receiving the tube (17) through the plate (20) is disposed away from the centre of said plate (20).

9. The melting furnace according to claim 1, wherein the tube (17) has a circumferentially projecting portion (25) in the region of its upper end (31), said projecting portion having an external diameter greater than the diameter of the tube section below it.

10. The melting furnace according to claim 9, wherein the tube (17) has a section with an external thread (32) above the circumferentially projecting portion (25) for receiving a cap nut (33) and that the tube (17) has a section inside its upper end portion (22) that is larger than the tube section below it for receiving the sight glass (18) of substantially equal cross-section, wherein the sight glass (18) is mounted inside the upper end portion (22) by means of the cap nut (33).

11. The melting furnace according to claim 9, wherein the circumferentially projecting portion (25) is guided into a recess (29) in a plate (20), a seal (30) being located between said projecting portion (25) and said recess (29), and the tube (17) has a lower tube section with a thread (26) for receiving a nut (19) by means of which the projecting portion (25) is pulled into the recess (19) against a biasing force exerted by one or more disc springs (28) arranged between the nut (19) and the plate (20), simultaneously sealing a space between the projecting portion (25) and the recess (29).

12. The melting furnace according to claim 11, wherein a maximum permissible over-pressure in the melting chamber (11) can be set by means of the nut (19) and/or the at least one disc spring (28), above which the space sealed by the seal (30) at pressures lower than said maximum permissible over-pressure is released in order to limit the over-pressure to the maximum permissible over-pressure.

13. The melting furnace according to claim 1, wherein the tube has a lower end opposite the upper end and where the lower end is positioned in a lower portion of the melting chamber of the melting furnace spaced from the upper end of the melting furnace.

14. The melting furnace according to claim 13, wherein the lower end of the tube is positioned in the melting chamber of the melting furnace to inhibit smoke and particulates from collecting in the tube.

15. The melting furnace according to claim 14, wherein the tube is oriented vertically with respect to the melting chamber of the melting furnace.

16. The melting furnace according to claim 1, wherein the optical system of the pyrometer measures the temperature of the melting charge through the open lower end of the tube.

17. The melting furnace according to claim 1, wherein the open lower end of the tube is open to the atmosphere of the crucible.

18. The melting furnace according to claim 1, wherein the melting furnace is a furnace for precision casting.

* * * * *